May 9, 1939.  C. B. MIRICK  2,157,139

BATTERY CHARGING SYSTEM

Filed May 22, 1936

INVENTOR.
Carlos B. Mirick
BY
ATTORNEY

Patented May 9, 1939

2,157,139

UNITED STATES PATENT OFFICE 2,157,139

BATTERY CHARGING SYSTEM

Carlos B. Mirick, Washington, D. C.

Application May 22, 1936, Serial No. 81,155

4 Claims. (Cl. 171—314)

(Granted under the act of March 3, 1883, as amended April 30, 1928; 370 O. G. 757)

My invention relates to improvements in storage batteries adapted for use in a constant potential charging system and in an improved method of charging such batteries from a constant potential source.

Heretofore, in charging batteries from a constant potential source, it has been the custom to subject the battery to a constant source of potential and permit the continued charging thereof. Such a method has proved to be satisfactory so long as there is no large variation in the ambient temperature. Since the temperature coefficient of the internal resistance of the storage battery is negative, because it is largely dependent upon the specific condition of the electrolyte, it is evident that when employing the aforementioned method for charging batteries a variation in the ambient temperature will interfere with the normal and predetermined charging rate and in many instances will result in excessive charging currents with consequent deterioration of the storage battery.

With a view to obviating the foregoing deficiencies, it is an object of my invention to associate with the well known storage batteries now in use a resistance means of such a value and temperature coefficient of resistance that any change in the internal resistance of the battery due to a variation in the ambient temperature will be compensated for, thereby making certain that a normal and predetermined charging rate will be maintained when using a constant potential system.

It is a further object of my invention to provide an improved method of charging storage batteries by employing a constant potential and automatically compensating for any change of the internal battery resistance to thereby maintain the predetermined and normal charging rate.

These and other objects will become apparent from the following detailed description and drawing, wherein.

Figure 1:
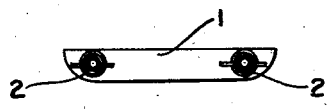
Fig. 1 is a plan view of the auxiliary resistance unit.
Figure 2:
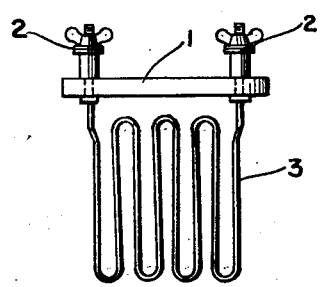
Fig. 2 is a view in elevation of said unit.
Figure 3:
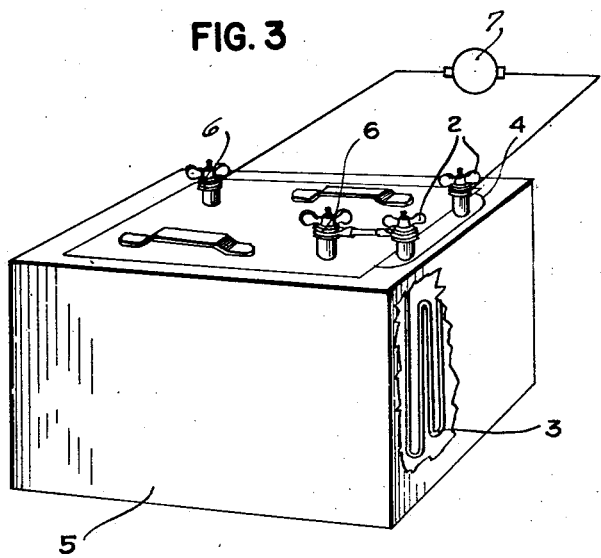
Fig. 3 shows a conventional storage battery having associated therewith in intimate thermal relation the auxiliary resistance unit.

Turning now to Figs. 1 and 2, there is shown therein a block 1 of insulating material having secured thereto the terminals 2 to which is connected an auxiliary resistance element 3. The electrical resistance of this element must have a positive temperature coefficient of resistance and may be of any suitable material so long as the product of the resistance and its temperature coefficient of resistance is equal and opposite in value to the product of the battery resistance and its temperature coefficient of resistance. Since the introduction of dissimilar metals in the battery circuit is undesirable because of the tendency toward electrolytic action, it is desirable to use copper for the auxiliary resistance since the leads are usually of this material. The auxiliary resistance is provided with a coating of acidproof material such as lead or rubber so as to protect it against any deleterious action of the electrolyte.

The insulating block 1 of the auxiliary resistance unit is sealed in a suitable aperture 4 of the storage battery 5 and the resistance element 3 thereof is placed in intimate contact with the electrolyte so as to have at all times substantially the temperature thereof. One of the terminals 2 of the auxiliary resistance unit is electrically connected to one of the battery terminals 6. A convenient source of constant potential 7 is shown suitably connected to the terminals 2 and 6 for charging the storage battery.

In order that the changes in resistance of the auxiliary resistance unit may be equal and opposite in value to those of the battery, it is necessary that the product of the internal resistance of the battery and its temperature coefficient of resistance be equal and opposite in value to the product of the resistance of the auxiliary resistance unit and its temperature coefficient of resistance.

Thus, if $R_0$=the equivalent internal resistance of the battery;

$R_1$=the resistance of the auxiliary resistance unit;

$\alpha_0$=the temperature coefficient of resistance of the battery;

and $\alpha_1$=the temperature coefficient of the auxiliary resistance unit:

Then, $R_0\alpha_0 = R_1\alpha_1$.

It is to be observed that the two temperature coefficients of resistance need not be themselves equal in magnitude in order to obtain the desired result but only that their products with the corresponding resistances be equal and opposite in value.

Since the value of the auxiliary resistance is small, the efficiency of the battery will not be appreciably impaired.

According to the provisions of the patent statutes, I have explained the principle and mode of operation of my invention and have illustrated and described what I now consider to represent its best embodiment. However, I desire to have it understood that within the scope of the appended claims the invention may be practiced otherwise than as specifically illustrated and described.

The invention described herein may be manufactured and used by or for the Government of the United States of America for governmental purposes without the payment of any royalties thereon or therefor.

I claim:

1. A constant potential system for charging storage batteries, comprising in combination a substantially constant source of charging voltage, a storage battery the resistance of which varies with changes in the ambient temperature and which is arranged to be charged by the aforesaid source of voltage, an auxiliary resistance having substantially the same temperature as those elements of the battery upon which its resistance depends and connected in circuit therewith, the product of the auxiliary resistance and its temperature coefficient of resistance being substantially equal and opposite in value to the product of the resistance of the battery and its temperature coefficient of resistance, whereby to compensate for any change in the battery resistance due to a change in the ambient temperature and thus insure the maintenance of a normal and predetermined charging rate.

2. A constant potential system for charging storage batteries, comprising in combination a substantially constant source of charging voltage, a storage battery the resistance of which varies with changes in the ambient temperature and is in part comprised by the electrolyte therein, the said battery being arranged to be charged by the aforesaid source of voltage, an auxiliary resistance unit connected in circuit with said battery and thermally associated with said electrolyte to thereby have at all times substantially the same temperature as that of the electrolyte, the product of the resistance of the auxiliary resistance unit and its temperature coefficient of resistance being substantially equal and opposite in value to the product of the resistance of the battery and its temperature coefficient of resistance, whereby to compensate for any change in the battery resistance due to a change in the ambient temperature and thus insure the maintenance of a normal and predetermined charging rate.

3. A constant potential system for charging storage batteries, comprising in combination a substantially constant source of charging voltage, a storage battery the resistance of which varies with changes in the ambient temperature and is in part comprised by the electrolyte therein, the said battery being arranged to be charged by the aforesaid source of voltage, an auxiliary resistance unit connected in circuit with said battery and thermally associated with said electrolyte to thereby have at all times substantially the same temperature as that of the electrolyte, said resistance unit including a resistance provided with means protecting the same against deleterious action by the electrolyte, the product of the resistance of the auxiliary resistance unit and its temperature coefficient of resistance being substantially equal and opposite in value to the product of the resistance of the battery and its temperature coefficient of resistance, whereby to compensate for any change in the battery resistance due to a change in the ambient temperature and thus insure the maintenance of a normal and predetermined charging rate.

4. A constant potential system for charging storage batteries, comprising in combination a substantially constant source of charging voltage, a storage battery the resistance of which varies with changes in the ambient temperature and the temperature coefficient of resistance of which is negative, the said battery being arranged to be charged by the aforesaid source of voltage, an auxiliary resistance connected in circuit with the battery and having a positive temperature coefficient of resistance, said auxiliary resistance having substantially the same temperature as that of the battery and the products of the resistances and their respective temperature coefficients of resistance being substantially equal in magnitude, whereby to compensate for any change in the battery resistance due to a change in the ambient temperature and thus insure the maintenance of a normal and predetermined charging rate.

CARLOS B. MIRICK.